United States Patent [19]

Maroni et al.

[11] 4,031,921

[45] June 28, 1977

[54] HYDROGEN-ISOTOPE PERMEATION BARRIER

[75] Inventors: Victor A. Maroni, Naperville; Erven H. Van Deventer, Joliet, both of Ill.

[73] Assignee: The United States of America as represented by the United States Energy Research and Development Administration, Washington, D.C.

[22] Filed: Sept. 9, 1975

[21] Appl. No.: 611,722

[52] U.S. Cl. .............................. 138/140; 428/586; 138/143; 138/177
[51] Int. Cl.² ................. B32B 15/18; B32B 15/20
[58] Field of Search ............. 29/194, 196.3, 198, 29/199; 138/143, 140, 177

[56] References Cited

UNITED STATES PATENTS

| | | | |
|---|---|---|---|
| 2,718,690 | 9/1955 | Ulam | 29/196.3 |
| 2,845,698 | 8/1958 | Giovannucci et al. | 29/194 |
| 3,381,364 | 5/1968 | Winter | 29/199 |
| 3,589,873 | 6/1971 | Poth | 29/196.3 |
| 3,589,874 | 6/1971 | Butt | 29/196.3 |
| 3,614,379 | 10/1971 | Troton | 29/196.3 |
| 3,861,884 | 1/1975 | Popplewell | 29/199 |

*Primary Examiner*—L. Dewayne Rutledge
*Assistant Examiner*—E. L. Weise
*Attorney, Agent, or Firm*—Dean E. Carlson; Frank H. Jackson; Hugh W. Glenn

[57] ABSTRACT

A composite including a plurality of metal layers has a Cu-Al-Fe bronze layer and at least one outer layer of a heat and corrosion resistant metal alloy. The bronze layer is ordinarily intermediate two outer layers of metal such as austenitic stainless steel, nickel alloys or alloys of the refractory metals. The composite provides a barrier to hydrogen isotopes, particularly tritium that can reduce permeation by at least about 30 fold and possibly more below permeation through equal thicknesses of the outer layer material.

2 Claims, 4 Drawing Figures

HYDROGEN-ISOTOPE PERMEATION BARRIER

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

The present invention relates to an improved barrier to hydrogen-isotope permeation at elevated temperature. It has application in any hydrogen isotope containment system, but is particularly useful in systems containing tritium at high temperatures where heat is to be transferred between corrosive fluids. For instance, the barrier may have application in cooling systems for plasma confinement devices and thermonuclear reactors. Systems of these types are illustrated in U.S. Pat. No. 3,957,597, May 18, 1976 entitled "Process For Recovering Tritium From Molten Lithium Metal", by Maroni; Proceedings Of The First Topical Meeting On The Technology Of Control Nuclear Fusion, "An Environmental Impact Study Of A Reference Theta-Pinch Reactor (RTPR)", CONF-740402 Pl, April 16–18, 1974, San Diego, California, and "An Engineering Study Of A Reference Theta-Pinch Reactor (RTPR)", Vols. 1 and 2, ANL-8019/LA-5339, February 1974 and March 1975.

A potentially significant effect of a fusion power plant is leakage of tritium to the environment. Tritium is considered to be a "low-hazard" isotope because of the low beta energy associated with its decay and because the biological half-life of tritium injested in the human body as HTO, either by breathing or drinking, is short (approximately 10 days). However, foods grown in a tritium environment may allow tritium to replace hydrogen in some carbohydrates. Because of this less direct hazard considerable care must be taken to prevent tritium leakage from any system that contains this isotope. Tritium is also a valuable fuel in D-T thermonuclear reactions and a valuable tracer isotope, thus adding an economic incentive for its containment.

Metal composites have previously been suggested by the inventor for use as hydrogen isotope barriers in fusion reactor reference designs. For instance, in "An Analysis Of Tritium Distribution And Leakage Characteristics For Two Fusion Reactor Reference Designs" CEN/CTR/TM-9, Mar. 13, 1974, various two and three-layer composites have been proposed. In particular, copper, aluminum, tungsten, molybdenum or gold have been suggested as intermediate layers between outer layers of stainless steel and high-nickel alloys. These composites, either, produce only a few fold decrease in permeability over that of the outer layers used alone or are difficult to fabricate.

The inventor being aware of the shortcomings of the prior art has as an object of his invention to provide an improved barrier to hydrogen-isotope permeation.

It is a further object of the invention to provide a barrier that exhibits reduced hydrogen-isotope permeability without incurring significant increases in wall thickness or resistance to heat transfer.

It is also an object of the invention to provide a barrier to hydrogen isotopes that can reduce permeation by at least 30 or more fold below equal thicknesses of usual heat and corrosion resistant construction materials.

It is a further object of the invention to provide composite construction materials that can be used in complex heat transfer systems where different material-compatibility problems are associated with various coolants and working fluids.

SUMMARY OF THE INVENTION

A barrier to hydrogen-isotope permeation comprises a layer of a copper-aluminum-iron bronze, and at least one outer layer of a heat-resistant metal alloy such as an iron base alloy, a nickel base alloy, a niobium base alloy, a molybdenum base alloy or a vanadium base alloy.

BRIEF DESCRIPTION OF THE DRAWINGS

The present invention is illustrated in their accompanying drawings wherein.

DETAILED DESCRIPTION OF THE PREFERRED EMBODIMENT

Figure 1:
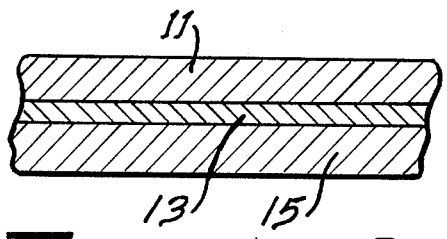
FIG. 1 is a fragmentary view in cross section of composite metal plate having three layers.

Referring to the drawings where FIG. 1 shows a three-layered, metal composite, including two outer layers 11 and 15 and an intermediate layer 13. In such a composite used as hydrogen-isotope permeation barrier, outer layers 11 and 15 can be of greater or lesser thickness than intermediate layer 13 and still be relied upon to provide structural strength in high-temperature environments.

Outer layers 11 and 15 are heat and corrosion resistant materials selected to be compatible with the temperatures and materials to which they are exposed. Base alloys of the refractory metals, molybdenum, vanadium and niobium are well suited for contacting molten lithium metal and molten salts, such as $LiBeF_3$, at temperatures of 300° to 700° C. Such conditions might well be encountered in cooling systems and breeding blankets for tritium in plasma-containment and thermonuclear fusion devices. Other materials that may be used as outer layers 11 and 15 include iron base alloys such as the austenitic stainless steels, e.g. 304 and 316 series as defined in Metals Handbook, Vol. 1, "Properties and Selection of Metals", page 467, (American Society of Metals, 1961). In addition, the outer layers can be of a high-nickel alloy, such as an Incoloy (A Trademark for a series of alloys having about 30 to 45% nickel, 13 to 21% chromium by weight and the remainder iron and minor constituents.) These alloys are particularly well suited for use with high temperature steam in excess of about 300° C.

The intermediate layer of copper-aluminum-iron bronze can be any suitable alloy of these metals having a major portion, that is, more than about 80% copper by weight and minor amounts of aluminum and iron. The preferred bronze alloy includes 10 weight % aluminum, 4 weight % iron and the remainder essentially copper. Minor amounts of other constituents such as nickel, manganese, or zinc might also be included. Bronzes of this type can be prepared metallurgically by known techniques and are commercially available, as, aluminum bronze, for examples see Metals Handbook, Vol. 1, pp. 1033–1036.

The preferred bronze composition has been found experimentally to have a hydrogen permeability of about 1 to $7 \times 10^{-3}$ cc (STP) mm/cm$^2$·atm at temperatures of 500 to 700° C. Even lower literature values of about $2 \times 10^{-4}$ at 600° C. have been found. These experimentally determined values of permeability are over a factor of 20 lower than those of pure copper and over 40 times lower than those of 304 stainless steel at 600° C. It is to be expected that a bonded three-layer composite of 304 stainless steel/Cu-Al-Fe bronze/304 stainless steel could be made to have a permeability of about 30 times lower than the permeability of an equally thick layer of 304 stainless steel at 600° C. Even further reductions in permeability may arise from defusional barriers formed from incorporation of surface impurities at the interfaces of the composite layers.

Figure 2:
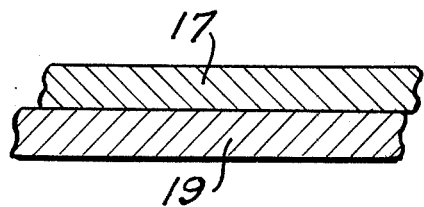
FIG. 2 is a fragmentary view in cross section of a two-layered metal composite.

FIG. 2 shows another embodiment of the present invention including only a two-layered bonded metal composite. Layer 17 represents a heat resistant material and layer 19 is of the copper-aluminum-iron bronze. A composite of this type can be used in applications where only one side of the composite is exposed to conditions that would be corrosive to the copper-aluminum-iron bronze.

Figure 3:
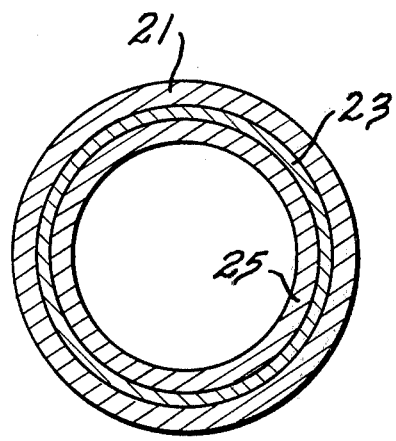
FIG. 3 is a cross section of a metal tube composed of composite tubular layers.

FIG. 3 illustrates a bonded metal composite in a tubular configuration. Layers 21 and 25 represent inner and outer tubular layers that can be of heat resistant materials as stated above. Intermediate layer 23 is of a copper-aluminum-iron bronze for the reduction of hydrogen-isotope permeation. In this configuration, reactive process fluids at high temperatures could be in contact with both the inner and outer surfaces of the composite tube.

The bonded metal composites of the present invention can be prepared by known metal forming and metallurgical techniques. The layers can be clamped, drawn or rolled together to form a tight mechanical bond. Treatment at elevated temperatures in order to interfuse the materials of one layer into another to form a metallurgical bond may be desirable in some applications. For example, in preparing the tubular metal composite of FIG. 3, outer layer 21 and intermediate layer 23 can be assembled in a close, but sliding fit and drawn over a mandrel that is slightly oversize compared to the inside diameter of tubular layer 23 while being held at an elevated temperature that is about 200 to 500° C. below the melting point of the lower melting material. Several passes can be made over hot mandrels of progressively increasing diameters with intervening annealing steps to relieve stresses until a sufficiently tight bond without gaps is made between the bronze and heat-resistant, metal tubes. Then the inner tube 25 of the composite can be similarly assembled and drawn with the previously bonded tubes over hot mandrels of progressively increasing diameters until the three-layer, metal composite is complete.

Figure 4:
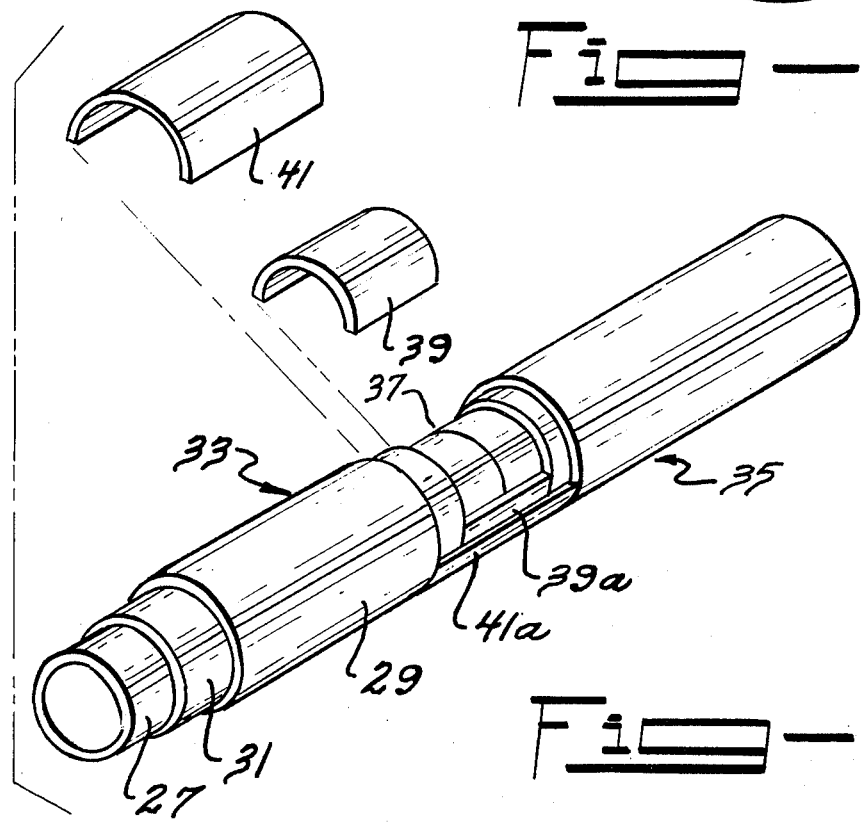
FIG. 4 is an exploded, perspective view of a joint between two composite tubes.

In FIG. 4, a connection or joint between two composite tubes 33 and 35 is shown. Each tube is composed of inner and outer tubular layers 27 and 29 of a heat and corrosion resistant metal with an intermediate layer 31 of a copper-aluminum-iron-bronze. The joint is formed by removing cylindrical end portions of the outer and intermediate layers 29 and 31 of both tubes such that the inner layers 27 can be butt welded at 37, for example, by electron beam welding. Half cylindrical inserts of the intermediate layer bronze 39 and 39a (in position) and of the outer layer metal 41 and 41a (in position) can then be sequentially butt welded to their corresponding layers at circumferential edges and to their corresponding half cylindrical inserts at lateral edges. Where necessary, the completed joint can be given additional support by surrounding the weld region with a cylindrical collar of the outer layer metal.

Composites in flat plate form can be prepared by known mechanical clamping, rolling and pressing techniques at elevated temperatures until the individual layers of the composite are sufficiently close to form tight gap-free interfaces.

One particularly useful metal composite that might be formed includes a first outer layer of a niobium base alloy for contacting molten lithium or molten-lithium salt, an intermediate layer of the copper, 10 weight % aluminum, 4 weight % iron bronze and a second outer layer of a high nickel alloy, such as Incoloy 800 for contacting molten sodium metal or steam. In a thermonuclear fusion system for the production of power, the fluid containing lithium would serve as a tritium breeding blanket and primary coolant while the molten sodium metal would be an intermediate heat transfer fluid that might also pass through a secondary heat exchanger for steam generation. With this three-layered composite in the primary heat exchanger, the secondary heat exchanger tubes could be of single layers of a high-nickel alloy. If, however, it is desirable to include composite heat exchanger tubes in both the primary and secondary heat exchangers, a system could be designed with the molten sodium contacting austenitic stainless steel (e.g. 316 stainless steel) in both the primary and secondary heat exchangers. In such an arrangement, the primary heat exchanger tubes could be, for example, three layer composites of niobium base alloy/Cu-Al-Fe bronze/austenitic stainless steel and the secondary heat exchanger tubes could comprise austenitic stainless steel/Cu-Al-Fe bronze/high-nickel alloy. Exposing the intermediate coolant to dissimilar metals in the primary and secondary heat exchangers would be particularly undesirable as dissolution, convection and redeposition of constituents within the construction materials could occur to cause severe weakening and erosion.

It will therefore be seen from the above that the present invention provides an improved barrier to hydrogen-isotope diffusion. The barrier can be employed in plasma confinement systems and thermonuclear devices as heat exchanger materials. By appropriately selecting individual layers of metal composites, hydrogen-isotope permeation can be reduced by substantial amounts without resorting to unduly thick layers of material that would reduce heat transfer rates and be prohibitively expensive. In addition composite construction materials are presented that can be used in complex heat transfer systems with primary, secondary and perhaps other cascaded heat exchangers to resolve materials compatibility problems.

The embodiments of the invention in which an exclusive property or privilege is claimed are defined as follows:

1. A composite tube for use as a hydrogen barrier in a system in which at least one surface contacts a molten salt of lithium containing tritium and an opposite surface contacts a liquid metal stream, said tube comprising an inner tubular layer of austenitic stainless steel, an intermediate, tubular layer of a bronze comprising about 10 weight % Al, 4 weight % Fe and the balance essentially Cu and a outer tubular layer of a refractory metal alloy selected from the group consisting of molybdenum base alloys, niobium base alloys and vanadium base alloys, said outer tubular layer being adapted for contacting said molten base of lithium metal.

2. The composite tube of claim 1 wherein said outer tubular layer comprises a niobium base alloy.

* * * * *